United States Patent Office 3,801,498
Patented Apr. 2, 1974

3,801,498
TETRAMETALLIC HYDROCARBON CONVERSION CATALYST AND USES THEREOF
Richard E. Rausch, Mundelein, Ill., assignor to Universal Oil Products Company, Des Plaines, Ill.
No Drawing. Continuation-in-part of application Ser. No. 142,079, May 10, 1971, now Patent No. 3,702,294, which is a continuation-in-part of applications Ser. No. 819,114, Apr. 24, 1969, now abandoned, and Ser. No. 807,910, Mar. 17, 1969, now Patent No. 3,740,328. This application Oct. 26, 1972, Ser. No. 301,006
Int. Cl. C10g 35/08; B01j 11/12
U.S. Cl. 208—139                                26 Claims

ABSTRACT OF THE DISCLOSURE

A catalytic composite comprising a combination of a platinum group component, a rhenium component, a Group I–B component and a tin component with a porous carrier material is disclosed. The principal utility of this composite is in the conversion of hydrocarbons, particularly in the reforming of a gasoline fraction. A specific example of the disclosed catalytic composite is a combination of a platinum component, a rhenium component, a tin component, a gold component and a halogen component with an alumina carrier material in amounts sufficient to result in a composite containing, on an elemental basis, about 0.01 to 2 wt. percent platinum, about 0.01 to 2 wt. percent rhenium, about 0.01 to 5 wt. percent tin, about 0.01 to about 5 wt. percent gold and about 0.1 to 3.5 wt. percent halogen.

CROSS-REFERENCES TO RELATED APPLICATIONS

This application is a continuation-in-part of my prior, copending application S.N. 142,079, filed May 10, 1971, now Pat. No. 3,702,294, which in turn is a continuation-in-part of (1) my prior, now abandoned application S.N. 819,114, filed on Apr. 24, 1969 and (2) my prior, co-pending application S.N. 807,910, filed on Mar. 17, 1969, now Pat. No. 3,740,328.

DISCLOSURE

The subject of the present invention is a novel tetrametallic catalytic composite which has exceptional activity and resistance to deactivation when employed in a hydrocarbon conversion process that requires a catalyst having both a hydrogenation-dehydrogenation function and a cracking function. More precisely, the present invention involves a novel dual-function catalytic composite which, quite surprisingly, enables substantial improvements in hydrocarbon conversion processes that have traditionally used a dual-function catalyst. In another aspect, the present invention comprehends the improved processes that are produced by the use of a catalytic composite comprising a combination of catalytically effective amounts of a platinum group component, a rhenium component, a Group I–B component and a tin component with a porous carrier material; specifically, an improved reforming process which utilizes the subject catalyst to sharply improve the performance characteristics of the over-all process.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, cracking, hydroisomerization, etc. In many cases, the commercial applications of these catalysts is in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes, and paraffins and the like reactions, to produce a high octane, aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions use—that is, the temperature, pressure, contact time, and presence of diluents such as $H_2$; (2) selectivity refers to the weight or volume or mole percent of the reactants that are converted into the desired product and/or products relative to the amount charged or converted; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of the $C_5+$ product stream; selectively refers to the amount of $C_5+$ yield that is obtained at the particular activity level relative to the amount of the charge stock; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability characteristics. In particular, for a reforming process the problem is typically expressed in terms of shifting and stabilizing the $C_5+$ yield-octane relationship—$C_5+$ yield being representative of selectivity and octane being proportional to activity.

I have now found a dual-function tetrametallic catalytic composite which possesses improved activity, selectivity, and stability characteristics when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, hydrodealkylation, transalkylation, cyclization, dehydrocyclization, cracking, hydrocracking, reforming, and the like processes. In particular, I have ascertained that the use of a tetrametallic catalyst, comprising a combination of catalytically effective amounts of a platinum group component, a rhenium component, a Group I-B component and a tin component with a porous refractory carrier material, can enable the performance of hydrocarbon conversion processes which have traditionally utilized dual-function catalysts to be substantially improved. Moreover, I have determined that a tetrametallic catalytic composite, comprising a combination of catalytically effective amounts of a platinum component, a tin component, a rhenium component, a Group I-B component, and a halogen component with an alumina carrier material, can be utilized to substantially improve the performance of a reforming process which operates on a gasoline fraction to produce a high-octane reformate. In the case of a reforming process, the principal advantage associated with the use of the novel catalyst of the present invention involves the acquisition of the capability to operate in a stable manner in a high severity operation; for example, a low pressure reforming process designed to produce a $C_5+$ reformate having an octane of about 100 F-1 clear. As indicated, the present invention essentially involves the finding that the addition of tin, a Group I-B metal and rhenium to a dual-function hydrocarbon conversion catalyst containing a platinum group component enables the performance characteristic of the catalyst to be sharply and materially improved.

It is, accordingly, one object of the present invention to provide a tetrametallic hydrocarbon conversion catalyst having superior performance characteristics when utilized in a hydrogen conversion process. A second object is to provide a catalyst having dual-function hydrocarbon conversion performance characteristics that are relatively insensitive to the deposition of hydrocarbonaceous material thereon. A third object is to provide preferred methods of preparation of this catalytic composite which insures the achievement and maintenance of its properties. Another object is to provide an improved reforming catalyst having superior activity, selectivity, and stability characteristics. Yet another object is to provide a dual-function hydrocarbon conversion catalyst which utilizes a combination of a relatively inexpensive component, tin, and relatively expensive components, rhenium, and a Group I-B method to promote a platinum metal component.

In brief summary, the present invention is, in one embodiment, a catalytic composite comprising a combination of a platinum group component, a rhenium component, a Group I-B component and a tin component with a porous carrier material. The porous carrier material is typically a porous, refractory material such as a refractory inorganic oxide, and the tin component, the rhenium component, the Group I-B component and the platinum group metallic component are usually utilized in relatively small amounts which are effective to catalytically promote the desired hydrocarbon conversion reaction. Moreover, substantially all of the platinum group, Group I-B and rhenium components of the catalyst are present therein in the elemental state, and substantially all of the tin component is present metallic state, and substantially all of the tin component is present therein in an oxidation state above that of the elemental metal.

A second embodiment relates to a catalytic composite comprising a combination of a platinum component, a rhenium component, a tin component, a Group I-B component and a halogen component with an alumina carrier material. These components are preferably present in the composite in amounts sufficient to result in the final composite containing, on an elemental basis, about .1 to about 3.5 wt. percent halogen, about 0.01 to about 2 wt. percent platinum, about 0.01 to about 5 wt. percent Group I-B metal, about 0.01 to about 2 wt. percent rhenium, and about 0.01 to about 5 wt. percent tin. In addition, the tin component is uniformly distributed throughout the carrier material and substantially all of the tin component is present therein in an oxidation state above that of the elemental metal. In contrast, substantially all of the platinum, Group I-B and rhenium components are present in the composite in the elemental metallic state.

Another embodiment relates to a catalytic composite comprising a combination of the catalytic composite characterized in the second embodiment with a sulfur component in an amount sufficient to incorporate about 0.05 to about 0.5 wt. percent sulfur, calculated on an elemental basis.

Yet another embodiment relates to a process for the conversion of a hydrocarbon comprising contacting the hydrocarbon and hydrogen with the catalytic composite of the first embodiment at hydrocarbon conversion conditions.

A preferred embodiment relates to a process for reforming a gasoline fraction which comprises contacting the gasoline fraction and hydrogen with the catalytic composite described above in the second embodiment at reforming conditions selected to produce a high-octane reformate.

Other objects and embodiments of the present invention relate to additional details regarding preferred catalytic ingredients, amounts of ingredients, suitable methods of composite preparation, operating conditions for use in the hydrocarbon conversion processes, and the like particulars. These are hereinafter given in the following detailed discussion of each of these facets of the present invention.

The tetrametallic catalyst of the present invention comprises a porous carrier material or support having combined therewith catalytically effective amounts of a platinum group component, a rhenium component, a tin component, a Group I–B component and in the preferred case, a halogen component. Considering first the porous carrier material utilized in the present invention, it is preferred that the material be a porous, adsorptive, high-surface area support having a surface area of about 25 to about 500 m.$^2$/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including these synthetically prepared and naturally-occurring, which may or may not be acid treated, for example, Attapulgus clay, china clay, diatomaceous earth, fuller's earth, kaoline, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline zeolitic aluminosilicates such as naturally-occurring or synthetically-prepared mordenite and/or faujasite, either in the hydrogen form or in a form which has been treated with multi-valent cations; (6) spinels such as $MgAl_2O_4$, $FeAl_2O_4$, $ZnAl_2O_4$, $MnAl_2O_4$, $CaAl_2O_4$ and other like compounds having the formula $MO \cdot Al_2O_3$ where M is a metal having a valence of 2; and, (7) combinations of elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-alumina, with gamma- or eta-alumina giving best results. In addition, in some embodiments the alumina carrier material may contain minor proportions of other well-known refractory inorganic oxides such as silica, zirconia, magnesia, etc.; however, the preferred support is substantially pure gama- or eta-alumina. Preferred carrier materials have an apparent bulk density of about 0.3 to about 0.7 g./cc. and surface area characteristics such that the average pore diameter is about 20 to 300 angstroms, the pore volume is about 0.1 to about 1 ml./g. and the surface area is about 100 to about 500 m.$^2$/g. In general, best results are typically obtained with a gamma-alumina carrier material which is used in the form of spherical particles having: a relatively small diameter (i.e. typically about 1/16 inch), an apparent bulk density of about 0.5 to about 0.6 g./cc., a pore volume of about 0.4 ml./g., and a surface area of about 175 m.$^2$/g.

The preferred alumina carrier material may be prepared in any suitable manner and may be synthetically prepared or natural occurring. Whatever type of alumina is employed it may be activated prior to use by one or more treatments including drying, calcination, steaming etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the catalyst of the present invention is a tin component. It is an essential feature of the present invention that the tin component is present in the composite in an oxidation state above that of the elemental metal. That is, the tin component will exist in the present catalytic composite in either the +2 or +4 oxidation state with the latter being the most likely state. Accordingly, the tin component will be present in the composite as a chemical compound, such as the oxide, sulfide, halide, etc., wherein tin is in the required oxidation state, or as a chemical combination with the carrier material in which combination the tin exists in this higher oxidation state. On the basis of the evidence currently available, it is believed that the tip component in the subject composite exists as stannic or stannous oxide. It is important to note that this limitation on the state of the tin component requires extreme care in the preparation and use of the subject composite in order to insure that it is subjected to oxidation conditions effective to produce tin oxide and that it is not thereafter subject to high temperature reduction conditions effective to produce the tin metal. Preferably, the tin component is used in an amount sufficient to result in the final catalytic composite containing, on an elemental basis, about 0.01 to about 5 wt. percent tin, with best results typically obtained with about 0.1 to about 2 wt. percent tin.

This tin component may be incorporated in the catalytic composite in any suitable manner such as by coprecipitation or cogellation with the porous carrier material, ion exchange with the carrier material or impregnation of the carrier material at any stage in the preparation. It is to be noted that it is intended to include within the scope of the present invention all conventional methods for incorporating a metallic component in a catalytic composite, and the particular method of incorporation used it not deemed to be an essential feature of the present invention. One preferred method of incorporating the tin component into the catalytic composite involves coprecipitating the tin component during the preparation of the preferred refractory oxide carrier material. In the preferred case, this involves the addition of suitable soluble tin compounds such as stannous or stannic halide to the alumina hydrosol, and then combining the hydrosol with a suitable gelling agent, and dropping the resulting mixture into an oil bath, etc., as explained in detail hereinbefore. Following the calcination step, there is obtained a carrier material comprising an intimate combination of alumina and stannic oxide. Another preferred method of incorporating the tin component into catalyst composite involves the utilization of a soluble, decomposable compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride is particularly preferred since it facilitates the incorporation of both the tin component and at least a minor amount of the preferred halogen component in a single step. In general, the tin component can be impregnated either prior to, simultaneously with, or after the other metallic components are added to the carrier material. However, I have found that excellent results are obtained when the tin component is impregnated simultaneously with the other metallic components. In fact, a preferred impregnation solution contains chloroplatinic acid, perrhenic acid, chloroauric acid, hydrogen chloride, and stannous or stannic chloride.

Regardless of which tin compound is used in the preferred impregnation step, it is extremely important that the tin component be uniformly distributed throughout the carrier material during this step. In order to achieve this objective it is necessary to maintain the pH of the impregnation solution in at a relatively low level a range of about 1 to about 7, preferably 1 to about 3, and to dilute the impregnation solution to a volume which is approximately equivalent to or greater than the volume of the carrier material which is impregnated. It is preferred to use a volume ratio of impregnation solution to carrier material of at least 0.5:1 and preferably about 0.75:1 to about 2:1 or more. Similarly, it is preferred to use a relatively long contact time during the impregnation step ranging from about ¼ hour up to about ½ hour or more before drying to remove excess solvent in order to insure a high dispersion of the tin component into the carrier material. The carrier material is, likewise, preferably constantly agitated during this preferred impregnation step.

A second essential component of the subject catalyst is the platinum group component. Although the process of the present invention is specifically directed to the use of a catalytic composite containing platinum, it is intended to include other platinum group metals such as palladium, rhodium, ruthenium, osmium, and iridium. It is an essential feature of the present invention that substantially all of the platinum group component, such as platinum, exists within the final catalytic composite in the elemental metallic state. Generally, the amount of the platinum group component present in the final catalyst composite is small compared to the quantities of the other components component generally comprises about 0.01 to about 2 wt. nents combined therewith. In fact, the platinum group percent of the final catalytic composite, calculated on an elemental basis. Excellent results are obtained when the catalyst contains about 0.05 to about 1 wt. percent of the platinum group metal. The preferred platinum group component is elemental platinum metal.

The platinum group component may be incorporated in the catalytic composite in any suitable manner such as coprepicitation or cogellation with the preferred carrier material, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of a suitable soluble platinum group metal compound such as chloroplatinic acid. Other water-soluble compounds of platinum group metals may be employed in impregnation solutions and include ammonium chloroplatinate, bromoplatinic acid, platinum chloride, dinitrodiaminoplatinum, platinum sulfate, chloropalladic acid, palladium chloride, palladium nitrate, palladium sulfate and the like compounds. The utilization of a platinum chloride compound, such as chloroplatinic acid, is preferred since it facilitates the incorporation of both the platinum group component and at least a minor quantity of the preferred halogen component in a single step. Hydrogen chloride or the like acid is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases it may be advantageous to impregnate the carrier material when it is in a gelled state.

A third essential component of the catalyst of the present invention is the rhenium component. It is an essential feature of the present invention that substantially all of the rhenium component of the catalyst is present therein as the elemental metal, and the hereinafter described reduction step is specifically designed to reduce this component along with the platinium group and Group I-B components. The rhenium component is preferably utilized in an amount sufficient to result in a final catalytic composite containing about 0.01 to about 2 wt. percent rhenium and preferably about 0.05 to about 1, calculated on an elemental basis.

The rhenium component may be incorporated in the catalytic composite in any suitable manner and at any stage in the preparation of the catalyst. It is generally advisable to incorporate the rhenium component in an impregnation step after the porous carrier material has been formed in order that the expensive metal will not be lost due to washing and purification treatments which may be applied to the carrier material during the course of its production. Although any suitable method for incorporating a catalytic component in a porous carrier material can be utilized to incorporate the rhenium component, the preferred procedure involves impregnation of the porous carrier material. The impregnation solution can, in general, be a solution of a suitable soluble, decomposable rhenium salt such as ammonium perrhenate, sodium perrhenate, potassium perrhenate, and the like salts. In addition, solutions of rhenium halides such as rhenium chloride may be used; the preferred impregnation solution is, however, an aqueous solution of perrhenic acid. The porous carrier material can be impregnated with the rhenium component either prior to, simultaneously with, or after the other metallic components mentioned herein are combined therewith. Best results are ordinarily achieved when the rhenium component is impregnated simultaneously with the other metallic components. In fact, excellent results are obtained with a one step impregnation procedure utilizing as an impregnation solution, an aqueous solution of chloroplatinic acid, chloroauric acid, perrhenic acid, stannic chloride, and hydrochloric acid.

Another essential constituent of the instant catalyst is a Group I-B metallic component. By the use of the expression "Group I-B" metallic component it is intended to cover the metals of Group I-B of the Periodic Table: copper, silver, gold, and mixtures of these metals. Although this Group I-B metallic component may be initially incorporated in the catalytic composite as a chemical combination with one or more of the other ingredients of the composite, or as a chemical compound of the Group I-B metal such as the nitrate, carbonate, hydroxide, oxide, sulfide, halide, oxyhalide, oxychloride, and the like compounds, it is an essential feature of the present invention that substantially all of the Group I-B component is present in the final catalyst in the elemental metallic state. The subsequently described oxidation and reduction steps, that are used in the preparation of the instant tetrametallic composite, are believed to result in a catalytic composite which contains the Group I-B component in the elemental state regardless of the state it was in when it was incorporated into the composite. This Group I-B component can be utilized in the present composite in any amount which is catalytically effective with the preferred amount being about 0.01 to about 5 wt. percent thereof, and the most preferred amount being about 0.05 to 2 wt. percent, calculated on an elemental basis. For instance, in the case where this component is gold, it is usually a good practice to select the amount of this component from the low end of this range—namely, about 0.05 to about 2 wt. percent. In the case where this component is silver, it is the best practice to select from a relatively broader range of about 0.05 to about 3 wt. percent thereof. And in the case where this component is copper, the selection can be made from the full breadth of the stated range—specifically about 0.01 to about 5 wt. percent, with best results at about 0.05 to about 2 wt. percent.

This Group I-B component may be incorporated in the composite in any suitable manner known to the art such as by coprecipitation or cogellation with the porous carrier material, ion exchange with the carrier material, or impregnation of the carrier material at any stage in its preparation. It is to be noted that it is intended to include within the scope of the present invention all conventional procedures for incorporating a metallic component into a catalytic composite, and the particular method of incorporation used is not deemed to be an essential feature of the present invention. However, best results are believed to be obtained when the Group I-B component is uniformly distributed throughout the porous carrier material and the preferred methods are thus the ones known to result in this uniform distribution. One acceptable method of incorporating the Group I-B component into the catalytic composite involves cogelling the Group I-B component during the preparation of the preferred carrier material, alumina. This method typically involves the addition of a suitable soluble compound of the Group I-B metal of interest to the alumina hydrosol. The resulting mixture is then commingled with a suitable gelling agent such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group I-B metal and alumina. One especially preferred method of incorporating this component into the composite involves utilization of a soluble, decomposable compound of the particular Group I-B metal of interest to impregnate the porous carrier material either before, during or after the carrier material is calcined. In general, the solvent used during this impregnation step is selected on the basis of its capability to dissolve the desired Group I-B compound without affecting the porous carrier material which is to be impregnated; ordinarily, good results are obtained when water is the solvent; thus the preferred Group I-B compounds for use in this impregnation step are typically water-soluble and decomposable. Examples of suitable Group I-B compounds are: hexamminecopper (II) chloride, tetramminecopper (II) dithionate, tetrammine (II) nitrate, tetrammine copper (II) sulfate, copper (II) bromide, copper (II) fluoride, copper (II) chlorate, copper (II) perchlorate, copper (II) chloride, copper (II) formate, copper (II) nitrate, copper (II) sulfate, copper (II) acetate, silver acetate, silver perchlorate, silver chlorate, silver fluoride, silver nitrate, silver sulfate, gold (III) nitrate, gold (III) chloride, gold (III) bromide, tetrachlorauric (III), gold-potassium chloride, and the like compounds. In the case where the Group I-B component is gold, a preferred impregnation solution is an aqueous solution of chloroauric acid. In the case of silver, silver nitrate dissolved in water is preferred. And in the case of copper, copper nitrate in water is preferred. Regardless of which impregnation solution is utilized, the Group I-B component can be impregnated either prior to, simultaneously with, or after the other metallic components are added to the carrier material. Ordinarily, best results are obtained when this compound is impregnated simultaneously with the other metallic components of the composite. Likewise, best results are ordinarily obtained when the Group I-B component is gold.

It is generally preferred to incorporate a halogen component into the tetrametallic catalytic composite of the present invention. Accordingly, a preferred embodiment of the present invention involves a catalytic composite comprising a combination of a platinum group component, a tin component, a Group I-B component a rhenium component, and a halogen component with an alumina carrier material. Although the precise form of the chemistry of the association of the halogen component with the carrier material is not entirely known, it is customary in the art to refer to the halogen component as being combined with the carrier material, or with the other ingredients of the catalyst in the form of the halide (e.g., or the chloride). This combined halogen may be either fluorine, chlorine, iodine, bromine, or mixtures thereof. Of these fluorine, and, particularly, chlorine are preferred for the purposes of the present invention. The halogen may be added to the carrier material in any suitable manner, either during preparation of the support or before or after the addition of the other components. For example, the halogen may be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, may be combined with the carrier material during the impregnation of the latter with one of the metallic components such as the platinum group components; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5%, and preferably about 0.5 to about 1.5%, by weight of halogen calculated on an elemental basis. In isomerization or hydrocracking embodiments, it is generally preferred to utilize relatively larger amounts of halogen in the catalyst—typically, ranging up to about 10 wt. percent halogen calculated on an elemental basis, and more preferably about 1 to about 5 wt. percent.

Regarding the preferred amounts of the various metallic components of the subject catalyst, I have found it to be a good practice to specify the amounts of the rhenium component, Group I-B component and of the tin component as a function of the amount of the platinum group component. On this basis, the amount of the rhenium component is ordinarily selected so that the atomic ratio of rhenium to platinum group metal contained in the composite is about 0.1:1 to about 3:1, with the preferred range being about 0.25:1 to about 1.5:1. Similarly, the amount of the tin component is ordinarily selected to produce a composite containing an atomic ratio of tin to platinum group metal of about 0.1:1 to about 3:1, with the preferred range being about 0.25:1 to about 2:1. In the same fashion the amount of the Group I-B component is preferably selected so that the atomic ratio of Group I-B metal to platinum group metal is about 0.1:1 to about 2:1.

Another significant parameter for the instant catalyst is the "total metals content" which is defined to be the sum of the paltinum group component, the rhenium component, the Group I-B component and the tin component, calculated on an elemental tin, rhenium, Group I-B metal and platinum group metal basis. Good results are ordinarily obtained with the subject catalyst when this parameter is fixed at a value of about 0.15 to about 5 wt. percent, with best results ordinarily achieved at a metals loading of about 0.3 to about 2 wt. percent.

Integrating the above discussion of each of the essential and preferred components of the catalytic composite, it is evident that a particularly preferred catalytic composite comprises a combination of a platinum component, a rhenium component, a tin component, a gold component and a halogen component with an alumina carrier material in amounts sufficient to result in the composite containing about 0.5 to about 1.5 wt. percent halogen, about 0.05 to about 1 wt. percent platinum, about 0.05 to about 1 wt. percent rhenium, about 0.01 to about 5 wt. percent gold and about 0.05 to about 2 wt. percent tin. Accordingly, specific examples of especially preferred catalytic composites are as follows: (1) a catalytic composite comprising a combination of 0.5 wt. perecnt tin, 0.5 wt. percent rhenium, 0.25 wt. percent gold, 0.75 wt. percent platinum, and about 0.5 to about 1.5 wt. percent halogen with an alumina carrier material; (2) a catalytic composite comprising a combination of 0.1 wt. percent tin, 0.1 wt. percent rhenium, 0.1 wt. percent gold, 0.1 wt. percent platinum, and about 0.5 to about 1.5 wt. percent halogen with an alumina carrier material; (3) a catalytic composite comprising a combination of about 0.375 wt. percent tin, 0.375 wt. percent rhenium, 0.375 wt. percent gold, 0.375 wt. percent platinum, and about 0.5 to about 1.5 wt. percent halogen with an alumina carrier material; (4) a catalytic composite comprising a combination of 0.12 wt. percent tin, 0.1 wt. percent rhenium, 0.2 wt. percent platinum, 0.2 wt. percent gold and about 0.5 to about 1.5 wt. percent halogen with an alumina carrier material; (5) a catalytic composite comprising a combination of 0.25 wt. percent tin, 0.25 wt. percent platinum, 0.25 wt. percent rhenium, 0.25 wt. percent gold and about 0.5 to about 1.5 wt. percent halogen with an alumina carrier material; and, (6) a catalytic composite comprising a combination of 0.2 wt. percent tin, 0.2 wt. percent rhenium, 0.2 wt. percent platinum, 0.2 wt. percent gold and about 0.5 to about 1.5 wt. percent halogen with an alumina carrier material. The amounts of the components reported in these examples are, of course, calculated on an elemental basis.

In embodiments of the present invention wherein the instant tetrametallic catalytic composite is used for dehydrogenation of dehydrogenatable hydrocarbons or for the hydrogenation of hydrogenatable hydrocarbons, it is ordinarily a preferred practice to include an alkali or alkaline earth metal component in the composite. More precisely, this optional component is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 1 to about 5 wt. percent of the composite, calculated on an elemental basis. This optional alkali or alkaline earth metal component can be incorporated in the composite in any of the known ways, with impregnation with an aqueous solution of a suitable water-soluble, decomposable compound of the desired alkali or alkaline earth metal generally being preferred.

An optional ingredient for the tetrametallic catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith— for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride and the like compounds, with the aluminum halides and particularly aluminum chloride ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. percent of the carrier material generally being preferred.

Regardless of the details of how the components of the catalyst are combined with the porous carrier material, the final catalyst generally will be dried at a temperature of about 200 to about 600° F. for a period of at least about 2 to 24 hours or more, and finally calcined or oxidized at a temperature of about 700° F. to about 1100° F. in an air atmosphere for a period of about 0.5 to about 10 hours in order to convert substantially all of the metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

It is an essential feature of the present invention that the resultant oxidized catalytic composite is subjected to a substantially water-free reduction step prior to its use in the conversion of hydrocarbons. This step is designed to selectively reduce the platinum group, Group I-B and the rhenium components to the corresponding metals and to insure a uniform and finely divided dispersion of these metallic components throughout the carrier material, while maintaining the tin component in a positive oxidation state. Preferably, substantially pure and dry hydrogen (i.e. less than 20 vol. p.p.m. $H_2O$) is used as the reducing agent in this step. The reducing agent is contacted with the oxidized catalyst at conditions including a temperature of about 800° F. to about 1200° F. and a period of time of about 0.5 to 2 hours effective to reduce substantially all of the platinum group, Group I-B and rhenium components to their elemental metallic state while maintaining the tin component in an oxidation state above that of the elemental metal. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the selectively reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more. It is generally a good practice to perform this presulfiding step under substantially water-free conditions.

According to the present invention, a hydrocarbon charge stock and hydrogen are contacted with a tetrametallic catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperature and then are passed, into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the tetrametallic catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock, or a n-hexane-rich stock, or a mixture of xylene isomers, etc. In a dehydrogenatable embodiment, the charge stock can be any of the known dehydrogenatable hydrocarbons such as a $C_2$ to $C_{30}$ aliphatic compound, a $C_4$ to $C_{30}$ normal paraffin, a $C_8$ to $C_{12}$ alkylaromatic, a naphthene and the like. In hydrocracking embodiments, the charge stock will be typically a gas oil, heavy cracked cycle oil, etc. In addition, alkylaromatic and naphthenes can be conveniently isomerized by using the catalyst of the present invention. Likewise, pure hydrocarbons or substantially pure hydrocarbons can be converted to more valuable products by using the tetrametallic catalyst of the present invention in any of the hydrocarbon conversion processes, known to the art, that use a dual-function catalyst.

In a reforming embodiment, it is generally preferred to utilize the novel tetrametallic catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 p.p.m. and preferably less than 20 p.p.m.; expressed as weight of equivalent water in the charge stock. In general, this can be accomplished by careful control of the water present in the charge stock and in the hydrogen stream. The charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 p.p.m. of $H_2O$ equivalent. In general, it is preferred to dry the hydrogen stream entering the hydrocarbon conversion zone down to a level of about 10 vol. p.p.m. of water or less. This can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25 to 150° F., wherein a hydrogen-rich gas is separated from a high octane liquid product, commonly called an unstabilized reformate. When a super-dry operation is desired, at least a portion of this hydrogen-rich gas is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration, thereby controlling front-end volatility of the resulting reformate.

The conditions utilized in the numerous hydrocarbon conversion embodiments of the present invention are those customarily used in the art for the particular reaction, or combination of reactions, that is to be effected. For instance, alkylaromatic and paraffin isomerization conditions include: a temperature of about 32° F. to about 1000° F. and preferably about 75° to about 600° F.; a pressure of atmospheric to about 100 atmospheres; a hydrogen to hydrocarbon mole ratio of about 0.5:1 to about 20:1, and a LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dhydrogenation conditions include: a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 p.s.i.g. to about 3000 p.s.i.g.; a temperature of about 400° F. to about 900° F.; a LHSV of about 0.1 hr.$^{-1}$ to about 10 hr.$^{-1}$; and hydrogen circulation rates of about 1000 to 10,000 s.c.f. per barrel of charge.

In the reforming embodiment of the present invention the pressure utilized is selected from the range of about 0 p.s.i.g. to about 1000 p.s.i.g., with the preferred pressure being about 50 p.s.i.g. to about 600 p.s.i.g. Particularly good results are obtained at low pressure; namely, a pressure of about 50 to 350 p.s.i.g. In fact, is is a singular advantage of the present invention that it allows stable operation at lower pressure than have heretofore been successfully utilized in so-called "continuous" reforming systems (i.e. reforming for periods of about 15 to about 200 or more barrels of charge per pound of catalyst without regeneration) with all platinum, monometallic catalysts. In other words, the catalyst of the present invention allows the operation of a continuous reforming system to be conducted at lower pressure (i.e. 100 to about 350 p.s.i.g.) for about the same or better catalyst life before regeneration as has been heretofore realized with conventional monometallic catalysts at higher pressures (i.e. 400 to 600 p.s.i.g.). On the other hand, the stability feature of the present invention enables reforming operations conducted at pressures of 400 to 600 p.s.i.g. to achieve substantially increased catalyst life before regeneration.

Similarly, the temperature required for reforming is generally lower than that required for a similar reforming operation using a high quality catalyst of the prior art. This significant and desirable feature of the present invention is a consequence of the selectivity of the tetrametallic catalyst of the present invention for the octane-upgrading reactions that are preferably induced in a typical reforming operation. Hence, the present invention requires a temperature in the range of from about 800° F. to about 1100° F., and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for the catalyst of the present invention than for a high quality reforming catalyst which is manufactured in exactly the same manner as the catalyst of the present invention except for the inclusion of the Group I-B tin and rhenium components. Moreover, for the catalyst of the present invention, the $C_5+$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$, with a value in the range of about 1 to about 5 hr.$^{-1}$ being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following working examples are given to illustrate further the preparation of the catalytic composite of the present invention and the use thereof in the conversion of hydrocarbons. It is understood that the examples are intended to be illustrative rather than restrictive.

Example I

This example demonstrates a particularly good method of preparing the preferred catalytic composite of the present invention.

An alumina carrier material comprising 1/16 inch spheres is prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles and finally drying and calcining the aged and washed particles to form spherical particles of gamma-alumina containing about 0.3 wt. percent combined chloride. Additional details as to this method of preparing the preferred carrier material are given in the teachings of U.S. Pat. No. 2,620,314.

An aqueous solution containing chloroplatinic acid, perrhenic acid, chloroauric acid, stannic chloride and hydrogen chloride is then used to impregnate the gamma-alumina particles in amounts, respectively, calculated to result in a final composite containing, on an elemental basis, 0.375 wt. percent platinum, 0.375 wt. percent rhenium, 0.5 wt. percent tin and 0.25 wt. percent gold. In order to insure uniform distribution of the metallic components throughout the carrier material, the amount of hydrogen chloride corresponds to about 10 wt. percent of the alumina particles. This impregnation step is performed by adding the carrier material particles to the impregnation mixture with constant agitation. In addition, the volume of the solution is two times the volume of the carrier material particles. The impregnation mixture is maintained in contact with the carrier material particles for a period of about ½ hour at a temperature of about 70° F. Thereafter, the temperature of the impregnation mixture is raised to about 225° F. and the excess solution is evaporated in a period of about 1 hour. The resulting dried particles are then subjected to a calcination treatment in an air atmosphere at a temperature of about 925° F. for about 1 hour. The calcined spheres are then contacted with an air stream containing $H_2O$ and HCl in a mole ratio of about 40:1 for about 4 hours at 975° F. in order to adjust the halogen content of the catalyst particles to a value of about 0.90.

The resulting catalyst particles are analyzed and found to contain, on an elemental basis, about 0.375 wt. percent platinum, about 0.375 wt. percent rhenium, about 0.5 wt. percent tin, about 0.25 wt. percent gold and about 0.85 wt. percent chloride. For this catalyst, the atomic ratio of tin to platinum is 2.2:1, the atomic ratio of rhenium to platinum is 1.05:1 and the atomic ratio of gold to platinum is 0.66:1.

Thereafter, the catalyst particles are subject to a dry pre-reduction treatment designed to reduce the platinum, rhenium and gold components to the elemental state while maintaining the tin component in a positive oxidation state, by contacting them for 1 hour with a substantially pure hydrogen stream containing less than 5 vol. p.p.m. $H_2O$ at a temperature of about 1050° F., a pressure slightly above atmospheric and a flow rate of the hydrogen stream through the catalyst particles corresponding to a gas hourly space velocity of about 720 hr.$^{-1}$.

EXAMPLE II

A portion of the spherical tetrametallic catalyst particles produced by the method described in Example I are loaded into a scale model of a continuous, fixed bed reforming plant of conventional design. In this plant a heavy Kuwait naphtha and hydrogen are continuously contacted at reforming conditions: a liquid hourly space velocity of 1.5 hr.$^{-1}$, a pressure of 100 p.s.i.g., a hydrogen to hydrocarbon mole ratio of 8.1, and a temperature sufficient to continuously produce a $C_5+$ reformate of 102 F-1 clear.

It is to be noted that these are exceptionally severe conditions.

The heavy Kuwait naphtha has an API gravity at 60° F. of 60.4, an initial boiling point of 184° F., a 50% boiling point of 256° F., and an end boiling point of 360° F. In addition, it contains about 8 vol. percent aromatics, 71 vol. percent paraffins, 21 vol. percent naphthenes, 0.5 wt. parts per million sulfur, and 5 to 8 wt. parts per million water. The F–1 clear octane number of the raw stock is 40.0.

The fixed bed reforming plant is made up of a reactor containing the tetrametallic catalyst, a hydrogen separation zone, a debutanizer column, and suitable heating, pumping, cooling and controlling means. In this plant, a hydrogen recycle stream and the charge stock are commingled and heated to the desired temperature. The resultant mixture is then passed downflow into a reactor containing the tetrametallic catalyst as a fixed bed. An effluent stream is then withdrawn from the bottom of the reactor, cooled to about 55° F. and passed to a separating zone wherein a hydrogen-rich gaseous phase separates from a liquid hydrocarbon phase. A portion of the gaseous phase is continuously passed through a high surface area sodium scrubber and the resulting water-free hydrogen stream recycled to the reactor in order to supply hydrogen thereto, and the excess hydrogen over that needed for plant pressure is recovered as excess separator gas. The liquid hydrocarbon phase from the hydrogen separating zone is withdrawn therefrom and passed to a debutanizer column of conventional design wherein light ends are taken overhead as debutanizer gas and a $C_5+$ reformate stream recovered as bottoms.

The test run is continued for a catalyst life of about 20 barrels of charge per pound of catalyst utilized, and it is determined that the activity, selectivity, and stability of the present tetrametallic catalyst are vastly superior to those observed in a similar type test with a conventional commercial reforming catalyst. More specifically, the results obtained from the subject catalyst are superior to the platinum metal-containing catalyst of the prior art in the areas of hydrogen production, $C_5+$ yield at octane, average rate of temperature increase necessary to maintain octane, and $C_5+$ yield decline rate.

It is intended to cover by the following claims all changes and modifications of the above disclosure of the present invention which would be self-evident to a man of ordinary skill in the catalyst formulation art or the hydrocarbon conversion art.

I claim as my invention:

1. A catalytic composite comprising a combination of a platinum group component, a rhenium component, a tin component, and a Group I–B component with a porous carrier material in amounts sufficient to result in a composite containing, on an elemental basis, about 0.01 to about 2 wt. percent platinum group metal, about 0.01 to about 2 wt. percent rhenium, about 0.01 to about 5 wt. percent tin, and about 0.01 to about 5 wt. percent of a Group I–B metal, wherein substantially all of the platinum group component, and the rhenium component and the Group I–B component are present in the elemental metallic state and wherein substantially all of the tin component is present in an oxidation state above that of the elemental metal.

2. A catalytic composite as defined in claim 1 wherein the platinum group component is platinum metal.

3. A catalytic composite as defined in claim 1 wherein the tin component is tin oxide.

4. A catalytic composite as defined in claim 1 wherein the platinum group component is palladium metal.

5. A catalytic composite as defined in claim 1 wherein the Group I–B component is copper.

6. A catalytic composite as defined in claim 1 wherein the Group I–B component is silver.

7. A catalytic composite as defined in claim 1 wherein the Group I–B component is gold.

8. A catalytic composite as defined in claim 1 wherein the porous carrier material is a refractory inorganic oxide.

9. A catalytic composite as defined in claim 8 wherein the refractory inorganic oxide is gamma- or eta- alumina.

10. A catalytic composite comprising a combination of a catalytic composite defined in claim 1 with a halogen component in an amount sufficient to result in a composite, containing on an elemental basis, about 0.1 to about 3.5 wt. percent halogen.

11. A catalytic composite as defined in claim 10 wherein the halogen component is chlorine or a compound of chlorine.

12. A catalytic composite as defined in claim 1 wherein the composite contains, on an elemental basis, about 0.05 to about 1 wt. percent platinum group metal, about 0.05 to about 1 wt. percent rhenium, and about 0.05 to about 2 wt. percent tin and about 0.05 to about 2 wt. percent Group I–B metal.

13. A catalytic composite as defined in claim 1 wherein the atomic ratio of tin to the platinum group metal is about 0.1:1 to about 3:1, wherein the atomic ratio of rhenium to the platinum group metal is about 0.1:1 to about 3:1 and wherein the atomic ratio of Group I–B metal to platinum group metal is about 0.1:1 to about 2:1.

14. A catalytic composite comprising a combination of a platinum component, a rhenium component, a tin component, a gold component and a halogen component with an alumina carrier material in amounts sufficient to result in a composite containing, on an elemental basis, about 0.01 to 2 wt. percent platinum, about 0.01 to 2 wt. percent rhenium, about 0.01 to about 5 wt. percent tin, about 0.05 to about 2 wt. percent gold and about 0.1 to about 3.5 wt. percent halogen, wherein the tin component is uniformly distributed throughout the carrier material, wherein substantially all of the platinum, gold and rhenium components are present in the elemental metallic state and wherein substantially all of the tin component is present in an oxidation state above that of the elemental metal.

15. A catalytic composite as defined in claim 14 wherein the halogen component is a chlorine or a compound of chlorine.

16. A catalytic compoite comprising a combination of the catalytic composite defined in claim 14 with a sulfur component in an amount sufficient to result in a composite containing about 0.05 to about 0.5 wt. percent sulfur.

17. A catalytic composite as defined in claim 14 wherein the atomic ratio of tin to platinum is about 0.1:1 to about 3:1, wherein the atomic ratio rhenium to platinum is about 0.1:1 to about 3:1, and wherein the atomic ratio of gold to platinum is about 0.1:1 to about 2:1.

18. A catalytic composite as defined in claim 14 wherein the composite contains, on an elemental basis, about 0.05 to about 1 wt. percent platinum, about 0.05 to about 1 wt. percent rhenium, about 0.05 to about 2 wt. percent tin, about 0.05 to about 2 wt. percent gold and about 0.5 to about 1.5 wt. percent halogen.

19. A process for converting a hydrocarbon which comprises contacting the hydrocarbon and hydrogen with the catalytic composite defined in claim 1 at hydrocarbon conversion conditions.

20. A process for reforming a gasoline fraction which comprises contacting the gasoline fraction and hydrogen with th catalytic composite defined in claim 1 at reforming conditions.

21. A process as defined in claim 20 wherein said reforming conditions include a temperature of about 800 to about 1100° F., a pressure of about 0 to about 1000 p.s.i.g., a liquid hourly space velocity of about 0.1 to about 10 hr.$^{-1}$ and a mole ratio of hydrogen to hydrocarbon of about 1:1 to about 20:1.

22. A process as defined in claim 20 wherein the pressure is about 50 to about 350 p.s.i.g.

23. A process as defined in claim 23 wherein said contacting is performed in a substantially water-free environment.

24. A process for reforming a gasoline fraction which comprises contacting the gasoline fraction and hydrogen with the catalytic composite defined in claim 14 at reforming conditions.

25. A process for reforming a gasoline fraction which comprises contacting the gasoline fraction and hydrogen with the catalytic composite defined in claim 18 at reforming conditions.

26. A process as defined in claim 25 wherein the reforming conditions include a pressure of about 50 to about 350 p.s.i.g.

References Cited

UNITED STATES PATENTS

| | | | |
|---|---|---|---|
| 2,861,959 | 11/1958 | Thorn et al. | 208—138 |
| 2,911,357 | 11/1959 | Myers et al. | 208—138 |
| 2,952,611 | 9/1960 | Haxton et al. | 208—65 |
| 3,415,737 | 12/1968 | Kluksdahl | 208—138 |
| 3,449,237 | 6/1969 | Jacobson et al. | 208—138 |
| 3,567,625 | 3/1971 | Sinfelt et al. | 208—138 |
| 3,578,584 | 5/1971 | Hayes | 252—466 PT |
| 3,631,215 | 12/1971 | Clippinger et al. | 208—138 |

DELBERT E. GANTZ, Primary Examiner

S. L. BERGER, Assistant Examiner

U.S. Cl. X.R.

208—138; 252—441, 466 PT; 260—668, 683.3, 683.68; 208—12